United States Patent
Attfield et al.

(10) Patent No.: US 10,685,130 B2
(45) Date of Patent: Jun. 16, 2020

(54) SYSTEM AND METHODS FOR CONTEXT-AWARE AND SITUATION-AWARE SECURE, POLICY-BASED ACCESS CONTROL FOR COMPUTING DEVICES

(71) Applicant: Sequitur Labs, Inc., Issaquah, WA (US)

(72) Inventors: Philip Attfield, Fall City, WA (US); Paul Chenard, Corvallis, OR (US); Simon Curry, Chelmsford, MA (US); Julia Narvaez, Tacoma, WA (US); Mark Reed, Redmond, WA (US)

(73) Assignee: Sequitur Labs Inc., Issaquah, WA (US)

( * ) Notice: Subject to any disclaimer, the term of this patent is extended or adjusted under 35 U.S.C. 154(b) by 39 days.

(21) Appl. No.: 15/568,408

(22) PCT Filed: Apr. 20, 2016

(86) PCT No.: PCT/US2016/028481
§ 371 (c)(1),
(2) Date: Oct. 20, 2017

(87) PCT Pub. No.: WO2016/172237
PCT Pub. Date: Oct. 27, 2016

(65) Prior Publication Data
US 2018/0157858 A1 Jun. 7, 2018

Related U.S. Application Data

(60) Provisional application No. 62/150,527, filed on Apr. 21, 2015.

(51) Int. Cl.
*G06F 21/62* (2013.01)
*H04L 29/06* (2006.01)
(Continued)

(52) U.S. Cl.
CPC ........ *G06F 21/6218* (2013.01); *G06F 21/606* (2013.01); *H04L 63/20* (2013.01);
(Continued)

(58) Field of Classification Search
CPC ... H04L 63/20; G06F 21/6218; G06F 21/606; H04W 12/08
See application file for complete search history.

(56) References Cited

U.S. PATENT DOCUMENTS 5,881,225 A    3/1999 Worth
6,301,613 B1 *  10/2001 Ahlstrom ............ H04L 41/0853
                                                                    709/223
(Continued)

FOREIGN PATENT DOCUMENTS

EP    1339199          8/2003
WO    PCT/US06/017123   1/2008
(Continued)

OTHER PUBLICATIONS

"Computer Architecture: A Quantitative Approach", Hennessy J. and Patterson, D., 5th Ed. Morgan Kaufman (2011).
(Continued)

*Primary Examiner* — Sher A Khan
(74) *Attorney, Agent, or Firm* — JRG Attorneys at Law

(57) ABSTRACT

A system and methods for context-aware and situation-aware secure, policy-based access control for computing devices. The invention enhances the previously disclosed policy-based control system by adding contextual information to the set of resources by which a policy decision point can adjudicate a query to execute a transaction or to access a secure resource. Policy information points are able to store information collected over time related to resources under the control of the system. The system can further include an analytical processing engine capable of inferring new infor-
(Continued)

System architecture with storage and analytic processing enhancements
Arrows show potential query paths and directions, from source to responding or read object mation from existing information that also can be used by the decision points. The policy information points provide context to the decision. They are also able to consider and include information that is external to the system or detected outside the system itself.

10 Claims, 4 Drawing Sheets

(51) Int. Cl.
  H04W 4/70       (2018.01)
  G06F 21/60      (2013.01)
  H04W 12/08      (2009.01)
  H04W 4/80       (2018.01)

(52) U.S. Cl.
  CPC ............. *H04W 4/70* (2018.02); *H04W 12/08* (2013.01); *H04W 4/80* (2018.02)

(56) References Cited

U.S. PATENT DOCUMENTS

| | | |
|---|---|---|
| 7,140,035 B1 | 11/2006 | Karch |
| 7,240,015 B1 | 6/2007 | Karmouch |
| 7,246,233 B2 | 7/2007 | Brabson et al. |
| 7,400,891 B2 | 7/2008 | Aaron |
| 7,640,429 B2 | 12/2009 | Huang et al. |
| 7,797,544 B2 | 9/2010 | Dillaway |
| 7,941,647 B2 | 5/2011 | Yates |
| 8,014,721 B2 | 9/2011 | Johnson |
| 8,037,318 B2 | 10/2011 | Tahan |
| 8,127,982 B1 | 3/2012 | Casey et al. |
| 8,135,385 B2 | 3/2012 | Ohta |
| 8,176,336 B1 | 5/2012 | Mao |
| 8,185,959 B2 | 5/2012 | Bellwood |
| 8,230,399 B2 | 7/2012 | Vertes |
| 8,285,249 B2 | 10/2012 | Baker et al. |
| 8,321,498 B2 | 11/2012 | Maes |
| 8,463,819 B2 | 6/2013 | Shashikumar et al. |
| 8,468,586 B2 | 6/2013 | Koottayi et al. |
| 8,468,608 B1 | 6/2013 | Hernacki |
| 8,538,843 B2 | 9/2013 | Smith |
| 8,688,592 B1 | 4/2014 | Abramson |
| 8,880,047 B2 | 11/2014 | Konicek |
| 8,904,483 B1 | 12/2014 | Martini |
| 8,922,372 B2 | 12/2014 | Soffer |
| 9,053,456 B2 | 6/2015 | Verthein |
| 9,391,782 B1 | 7/2016 | Mironenko |
| 9,411,962 B2 | 8/2016 | Attfield |
| 2002/0101826 A1 | 8/2002 | Giacopelli |
| 2002/0138814 A1 | 9/2002 | Katayama |
| 2003/0125925 A1 | 7/2003 | Walther |
| 2004/0123139 A1 | 6/2004 | Aiello |
| 2004/0123153 A1 | 6/2004 | Wright |
| 2004/0204949 A1 | 10/2004 | Shaji |
| 2005/0132202 A1 | 6/2005 | Billaway |
| 2005/0193196 A1 | 9/2005 | Huang |
| 2006/0005239 A1 | 1/2006 | Mondri |
| 2006/0026548 A1 | 2/2006 | Rosener |
| 2006/0059565 A1 | 3/2006 | Green |
| 2006/0150256 A1 | 7/2006 | Fanton |
| 2006/0236369 A1 | 10/2006 | Covington |
| 2006/0236385 A1 | 10/2006 | Innes |
| 2007/0150559 A1 | 6/2007 | Smith |
| 2008/0085698 A1 | 4/2008 | Gamm |
| 2008/0086042 A1* | 4/2008 | Brister ............... A61B 5/14532 600/347 |
| 2008/0133914 A1 | 6/2008 | Isaacson |
| 2008/0184336 A1 | 7/2008 | Sarukkai |
| 2008/0194233 A1 | 8/2008 | Henry |
| 2008/0263625 A1* | 10/2008 | Gomez ............... G06F 21/6218 726/1 |
| 2009/0031141 A1 | 1/2009 | Pearson |
| 2009/0089125 A1 | 4/2009 | Sultan |
| 2009/0100269 A1 | 4/2009 | Naccache |
| 2009/0113538 A1* | 4/2009 | Eom ...................... G06F 21/335 726/12 |
| 2009/0193503 A1 | 7/2009 | Shevohenko |
| 2009/0198617 A1 | 8/2009 | Soghoian |
| 2009/0204785 A1 | 8/2009 | Yates, Jr. et al. |
| 2009/0205016 A1 | 8/2009 | Milas |
| 2009/0228951 A1* | 9/2009 | Ramesh ............... H04L 63/0218 726/1 |
| 2009/0300174 A1 | 12/2009 | Floris |
| 2010/0023454 A1 | 1/2010 | Exton |
| 2010/0023703 A1 | 1/2010 | Christie |
| 2010/0037311 A1 | 2/2010 | He |
| 2010/0199325 A1 | 8/2010 | Raleigh |
| 2010/0216429 A1 | 8/2010 | Mahajan |
| 2010/0250370 A1 | 9/2010 | Jones et al. |
| 2010/0299717 A1* | 11/2010 | Nasirifard ............... G06Q 10/06 726/1 |
| 2011/0055890 A1 | 3/2011 | Gaulin |
| 2011/0063098 A1 | 3/2011 | Fischer |
| 2011/0077758 A1 | 3/2011 | Tran |
| 2011/0154034 A1 | 6/2011 | Bailey, Jr. |
| 2011/0173108 A1 | 7/2011 | Rjasekar |
| 2011/0173122 A1 | 7/2011 | Singhal |
| 2011/0251958 A1 | 10/2011 | Aubin |
| 2011/0258692 A1 | 10/2011 | Morrison |
| 2011/0270751 A1 | 11/2011 | Csinger |
| 2012/0030731 A1 | 2/2012 | Bhargava |
| 2012/0129450 A1 | 5/2012 | Lee |
| 2012/0197743 A1 | 8/2012 | Grigg |
| 2012/0214516 A1 | 8/2012 | Rosenberg |
| 2012/0216012 A1 | 8/2012 | Vorbach et al. |
| 2012/0216244 A1* | 8/2012 | Kumar .................... G06F 21/31 726/1 |
| 2012/0270523 A1 | 10/2012 | Laudermilch |
| 2012/0323596 A1 | 12/2012 | Verhulst |
| 2012/0323717 A1 | 12/2012 | Kirsch |
| 2013/0029653 A1 | 1/2013 | Baker et al. |
| 2013/0031598 A1* | 1/2013 | Whelan ................... G01S 1/725 726/1 |
| 2013/0080411 A1 | 3/2013 | Rolia |
| 2013/0111544 A1* | 5/2013 | Balinsky ............. G06F 21/6218 726/1 |
| 2013/0124567 A1* | 5/2013 | Balinsky ................ G06F 21/00 707/783 |
| 2013/0125099 A1 | 5/2013 | Budiu |
| 2013/0130650 A1 | 5/2013 | Cheung |
| 2013/0145429 A1 | 6/2013 | Mendel |
| 2013/0179991 A1* | 7/2013 | White ..................... G06F 21/53 726/29 |
| 2013/0212022 A1 | 8/2013 | Lanc |
| 2013/0253942 A1 | 9/2013 | Liu et al. |
| 2013/0275746 A1 | 10/2013 | Galdwin |
| 2013/0298664 A1 | 11/2013 | Gillette, II |
| 2014/0007193 A1 | 1/2014 | Qureshi |
| 2014/0013112 A1 | 1/2014 | Cidon |
| 2014/0096186 A1 | 4/2014 | Barton |
| 2014/0115659 A1 | 4/2014 | Attfield et al. |
| 2014/0143089 A1 | 5/2014 | Campos |
| 2014/0143149 A1* | 5/2014 | Aissi ....................... G06F 21/31 705/44 |
| 2014/0173700 A1 | 6/2014 | Awan |
| 2014/0181290 A1* | 6/2014 | Wong ..................... H04L 63/10 709/224 |
| 2014/0195425 A1 | 7/2014 | Campos |
| 2014/0279474 A1 | 9/2014 | Evan |
| 2014/0379361 A1 | 12/2014 | Mahakar |
| 2015/0046970 A1* | 2/2015 | Shimizu ................. H04L 63/20 726/1 |
| 2015/0227925 A1 | 8/2015 | Filler |
| 2015/0278810 A1 | 10/2015 | Ramatchandirane |
| 2015/0302409 A1 | 10/2015 | Malek |
| 2015/0312277 A1 | 10/2015 | Rane et al. |
| 2015/0334133 A1 | 11/2015 | Schaffner et al. |
| 2015/0350254 A1 | 12/2015 | Hendrick et al. |
| 2015/0358822 A1 | 12/2015 | Hendrick et al. |
| 2016/0012216 A1 | 1/2016 | Attfield et al. |

(56) References Cited

U.S. PATENT DOCUMENTS

| | | |
|---|---|---|
| 2016/0314296 A1 | 10/2016 | Attfield et al. |
| 2017/0048714 A1 | 2/2017 | Attfield et al. |
| 2017/0244759 A1 | 8/2017 | Attfield et al. |

FOREIGN PATENT DOCUMENTS

| | | |
|---|---|---|
| WO | PCT/US08/009313 | 2/2009 |
| WO | WO2015/026389 | 2/2015 |
| WO | PCT/US15/24932 | 4/2015 |
| WO | PCT/US15/27561 | 4/2015 |
| WO | PCT/US14/70897 | 12/2015 |
| WO | PCT/US15/048526 | 3/2016 |
| WO | PCT/US16/28481 | 10/2016 |
| WO | PCT/US16/032502 | 11/2016 |
| WO | PCT/US16/029144 | 2/2017 |

OTHER PUBLICATIONS

"Computer Networks", Tanenbaum, A. Andrew and Wetherall, D., 5th Ed. Prentice Hall (2010).

"Prolog Programming: A First Course", BRNA, P. (Mar. 5, 2001). Retrieved from <http://homepages.inf.ed.ac.ud/pbma/prolog book/> on Mar. 16, 2013.

NFC Forum (2007), "Near Field Communication and the NFC Forum: The Keys to Truly Interoperable Communications" (PDF), http://www.nfc-forum.org, retrieved Oct. 30, 2012.

Landt, Jeremy (2001), "Shrouds of Time: The history of RFID", AIM, Inc. pp. 5-7.

Bluetooth Special Interest Group website, "A Look at the Basics of Bluetooth Wireless Technology", http:www.bluetooth.com/Pages/Basics.aspx, retrieved Oct. 29, 2012.

See e.g. H. Schildt, C++—The Complete Reference, 2nd edition, pp. 67-70 McGraw Hill, 1995, ISBN 0-07-882123-1.

K. Ashton, "That 'Internet of Things' Thing", RFID Journal Jun. 22, 2009 (available online as of Oct. 20, 2013 at http://www.rfidjournal.com/articles/view?4986).

T. White, Hadoop—The Definitive Guide, O'Reilly, 2009 978-0-596-52197-4.

Nakamoto, Satoshi. "Bitcoin: A peer-to-peer electronic cash system." Consulted Jan. 2012 (2008): 28. Obtained from http://www.cryptovest.co.ok/resources/Bitcoin%20paper%20 Original.pdf on Apr. 6, 2015.

Bitcoin, Inc. "What are multi-signature transactions?", Obtained from http://bitcoin.stackexchange.com/questions 3718/what-are-multi-signature-transactions on Apr. 6, 2015.

Verilog, http://www.verilog.comm/, accessed May 12, 2014.

L. Woods, ZS. Istvan, G. Alonzo Ibex(2014) An Intelligent Storage Engine with Support for Advanced SQL Off-loading. VLDB 2014k, Hangzhou, China, Sep. 2014.

University of British Columbia, Department of Electrical and Computer Engineering, http://www.ece.ubc.ca//~edc/379,ian99/lecgureslec 13.pdf, accessed May 2014.

IEEE P 1076 Working Group. http://www.eda.org/twiki/bin/view.cgi/P1076, accessed May 12, 2014.

\* cited by examiner

System architecture with enhancements.
Arrows show potential query directions, from source to responding object

System architecture with storage and analytic processing enhancements
Arrows show potential query paths and directions, from source to responding or read object

US 10,685,130 B2

SYSTEM AND METHODS FOR CONTEXT-AWARE AND SITUATION-AWARE SECURE, POLICY-BASED ACCESS CONTROL FOR COMPUTING DEVICES

PRIORITY CLAIM

This non-provisional application claims priority to Provisional Patent Application Ser. No. 62/150,527, entitled "System and Methods for Context-Aware and Situation-Aware Secure, Policy-Based Access Control for Computing Devices" filed Apr. 21, 2015.

TECHNICAL FIELD

The present invention relates to the technical fields of Computer Security, Mobile Computing, Telecommunications, Digital Communications, and Computer Technology.

BACKGROUND OF THE INVENTION

The primary advantage of the invention is to enable finely granular control over security policy that governs a wide variety of computing devices, systems, processes, and resources. Furthermore, the invention is not specific to security but can be generalized to any policy that might need to be applied to the use of a resource or an action a user wishes to take.

The invention is motivated by the rapid proliferation of mobile devices that increasingly have greater computing power than ever before. They also have networking capabilities and they interface with other devices and system easily via 802.11 wireless protocols and Bluetooth short range protocols, to name two of the most common. Furthermore, because mobile devices are "mobile", they are used in different computing contexts all the time, and often, they are used in a computing context once and only once. Therefore, the rules by which these devices operate in novel contexts must by dynamic, yet secure.

Lastly, the new "Internet of Things" (IoT) whereby objects of all types are being configured with lightweight computing and networking capabilities opens a myriad of new issues related to control and security that are unique to that class of computing hardware.

The "attack surface" of computing devices is changing and enlarging, therefore new systems and methods to control and enforce security policy are needed. While U.S. Patent Application 61/673,220 (now Ser. No. 13/945,677, which is incorporated by reference as if fully set forth herein) discloses an invention that is a framework for such control and security, it has shortcomings in the degree to which the system is context or situation-aware. Often, the context of a transaction or task that user wishes to execute is a critical component in determining if it should be allowed and if so, under what stipulations. The present invention addresses this issue and enhances U.S. Patent Application 61/673,220 to include these capabilities.

SUMMARY OF THE INVENTION

The level of granularity possible in a policy-based system for access control of mobile computing applications is greatly enhanced if the policy rules that govern the use of resources and approval of transactions can be made context-aware. To be context-aware, the system must not only be able to gather information about the context in which the user is operating, but it must be able to store that information for later use. Context requires a memory.

The present invention solves this problem by adding policy information points (PIPs) to the policy-based access control architecture. Policy decision points (PDPs) adjudicate queries that request approval for transaction or the use of resources. Policy enforcement points (PEPs) act on the decisions of the PDPs to enforce the policy and are associated directly with the resources on the device. Adding PIPs and an Analytical Processing Engine to the architecture allows the system to be aware of the context in which a query is made. The PDPs can then access information in the PIPs as input into the policy rules that are used to adjudicate the query.

The resulting system is far more expressive in the policy rules that can be formed and implemented and the system is able track variables over time, observe tendencies, threshold values, and other critical parameters necessary for highly granular policy rules.

DESCRIPTION OF THE INVENTION

Figure 1:
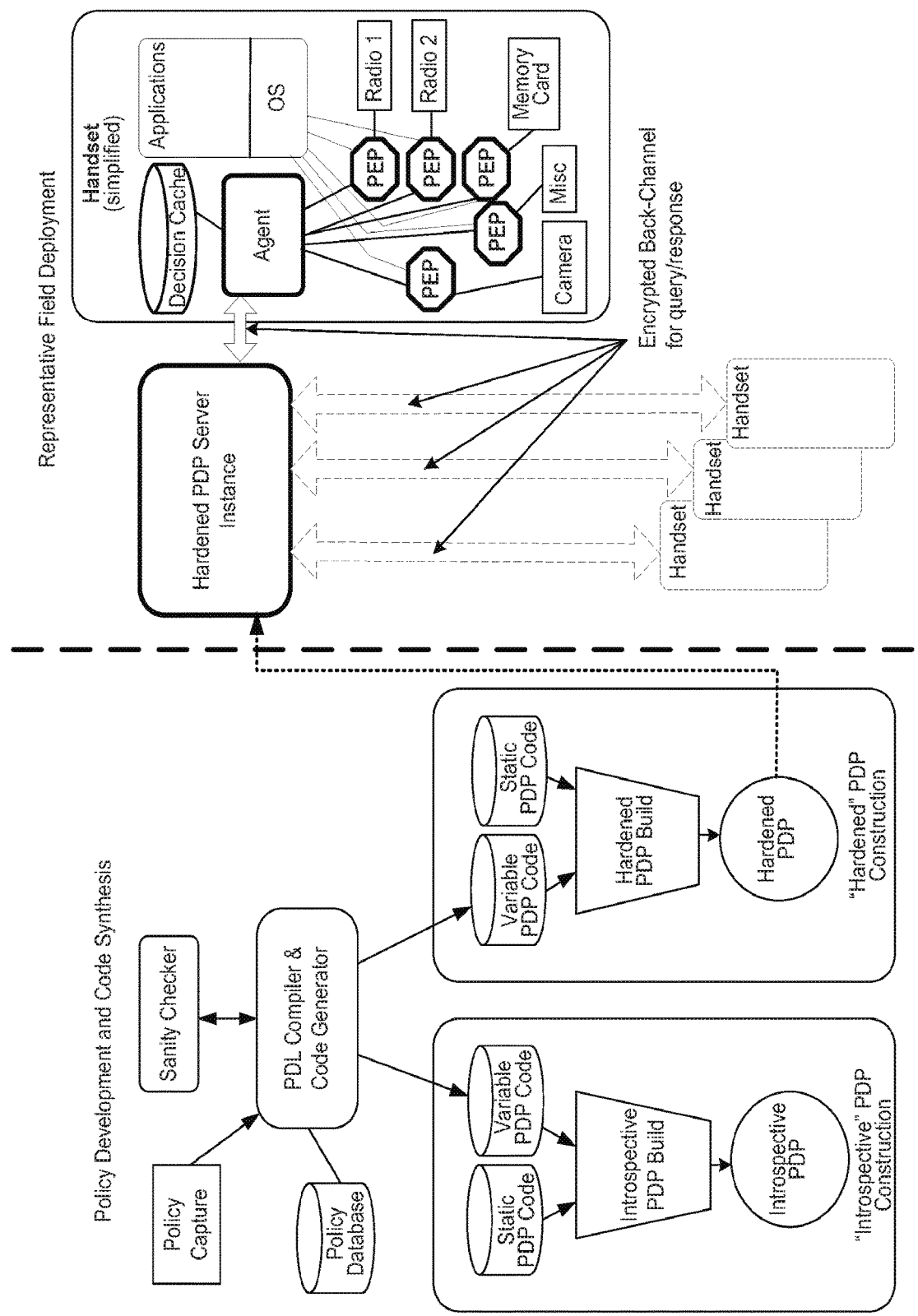
FIG. 1. Schematic representation of system
FIG. 2. Schematic representation of enhanced system with Policy Information Points
FIG. 3. Schematic representation of enhanced system with Policy Information Points and Analytic Processing Engine
FIG. 4. Schematic representation of the example application described in the disclosure.

U.S. Patent Application 61/673,220 discloses a system for policy-based access control and management for mobile computing devices (see FIG. 1). Particularly notable in this system is the granularity of control that it allows in regard to permitted operations, plus network, file system, and device access on handsets controlled by the system. Furthermore, the system utilizes one or more policy decision point (PDP) servers which respond to encrypted queries from handsets controlled by a given instance of the system. These PDP servers may be remote from the handset, or may even be hosted within the handset. The queries typically encapsulate requests for use of specific handset or network-accessible assets, and the PDP response to such a request is then received by the querying handset, with subsequent decisions made by the PDP then enforced at the Policy Enforcement Points (PEPs) on the handset. The term "handset" is used largely in regard to "smartphone" devices and similar phone devices, but the present invention is generally applicable for any computing device that might be a client in the system.

The present invention consists of a set of enhancements to the system disclosed in U.S. Patent Application 61/673,220. These enhancements may also have utility in cases and in systems other than those described in the 61/673,220 application. The enhancements disclosed herein pertain to capabilities for a computing device security system to respond to contextual events and information that occur outside or are stored externally to a given computing device that is managed by the system. Such events and information may include recent events and information, as well as older, historical data. Key objectives for the system are to be able to defend managed devices from global, system-wide or otherwise broadly applicable security threats, and to consider in response decisions certain contextual information that may be stored, maintained, or detected outside a system-managed device, such as, but not limited to, employee records, system conditions and alert levels, and environmental conditions.

Figure 2:
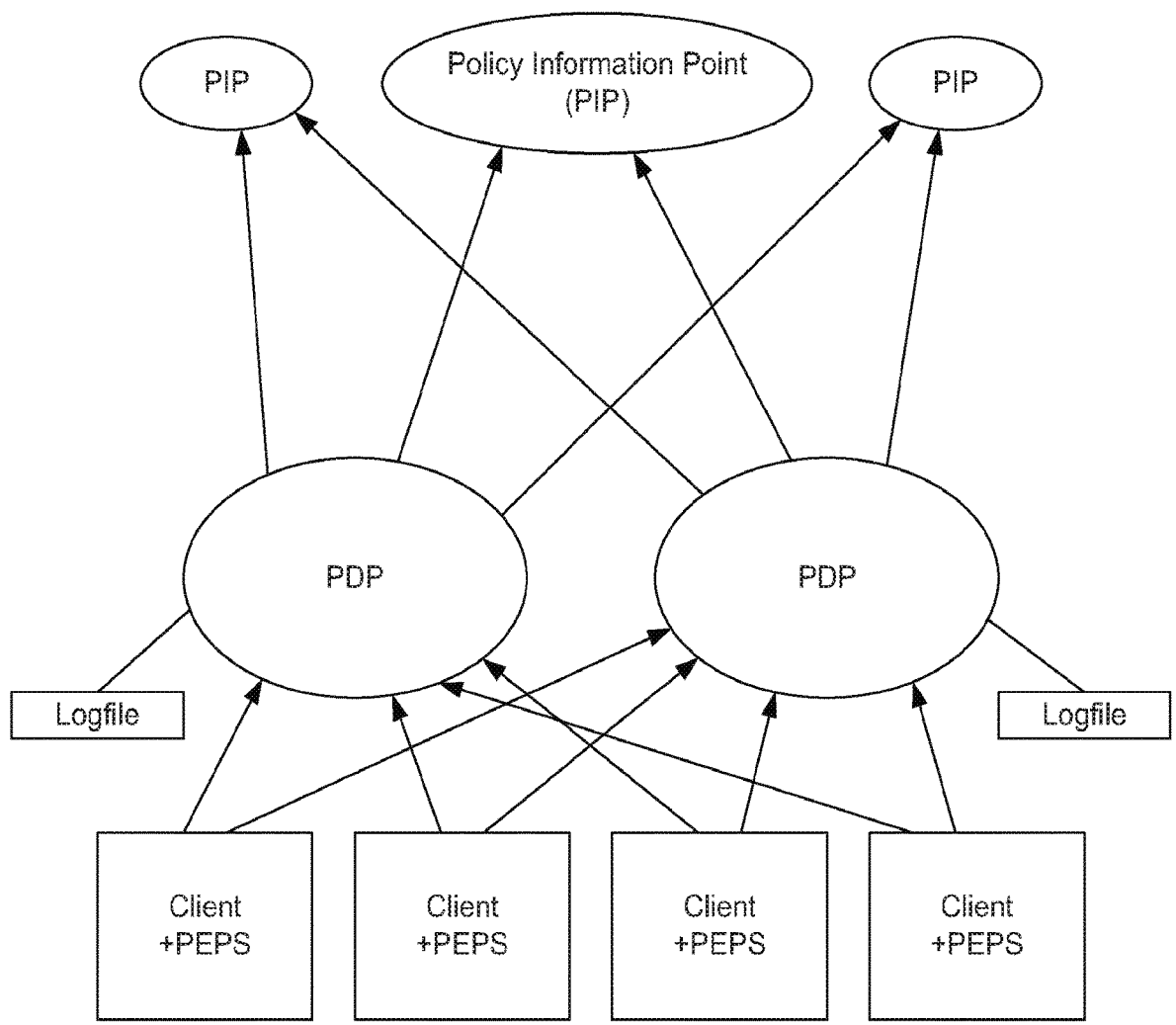

FIG. 2 presents a system architecture that is an augmentation to that presented in FIG. 1, for the purpose of supporting secure access to, and use of, such contextual and stored information within the system. A notable addition in FIG. 2 over FIG. 1 is the Policy Information Point (PIP). There may be one or a plurality of PIPs in the system. Each PIP contains information that may be required for the evaluation of policy decisions by PDPs in response to queries from client devices. Since PDPs are stateless by design, they do not serialize or contain contextual data or historical information that may be required in computing policy decisions, beyond expert knowledge that may be contained within policies themselves, and beyond local device data that may be contained in queries from client devices housing PEPs. It is a role of PIPs to provide such nonlocal, contextual information to PDPs in response to queries by PDPs.

Individual PIPs may store different information than other PIPs in a given system to suit the policy-based requests that they may need to support from PDPs. By way of non-limiting example, one subject-specific PIP can field requests from a multitude of PDPs. However, scaling of our system for handling large numbers of requests to PIPs can be accomplished by a multitude of PIPs containing identical information, similar, for example, to a RAID 1 configuration of hard disks, wherein any one of a set of identical PIPs can respond to information queries for decision computations for the same set of policies from PDPs.

Of primary importance in the system is the security and confidentiality of the information stored in it. PIPs may contain sensitive personal and corporate data, such as employee records, and other confidential information, and therefore measures are taken in the system to control and limit access to PIPs and the information that they contain.

Communication between PDPs and PIPs is performed by secure network means, such as encrypted traffic over TCP/IP or UDP. PDP access to PIP-stored data is read-only (RO), to prevent compromise of the stored information, and access to specific data can granted if authorized specifically within a given policy.

Figure 3:
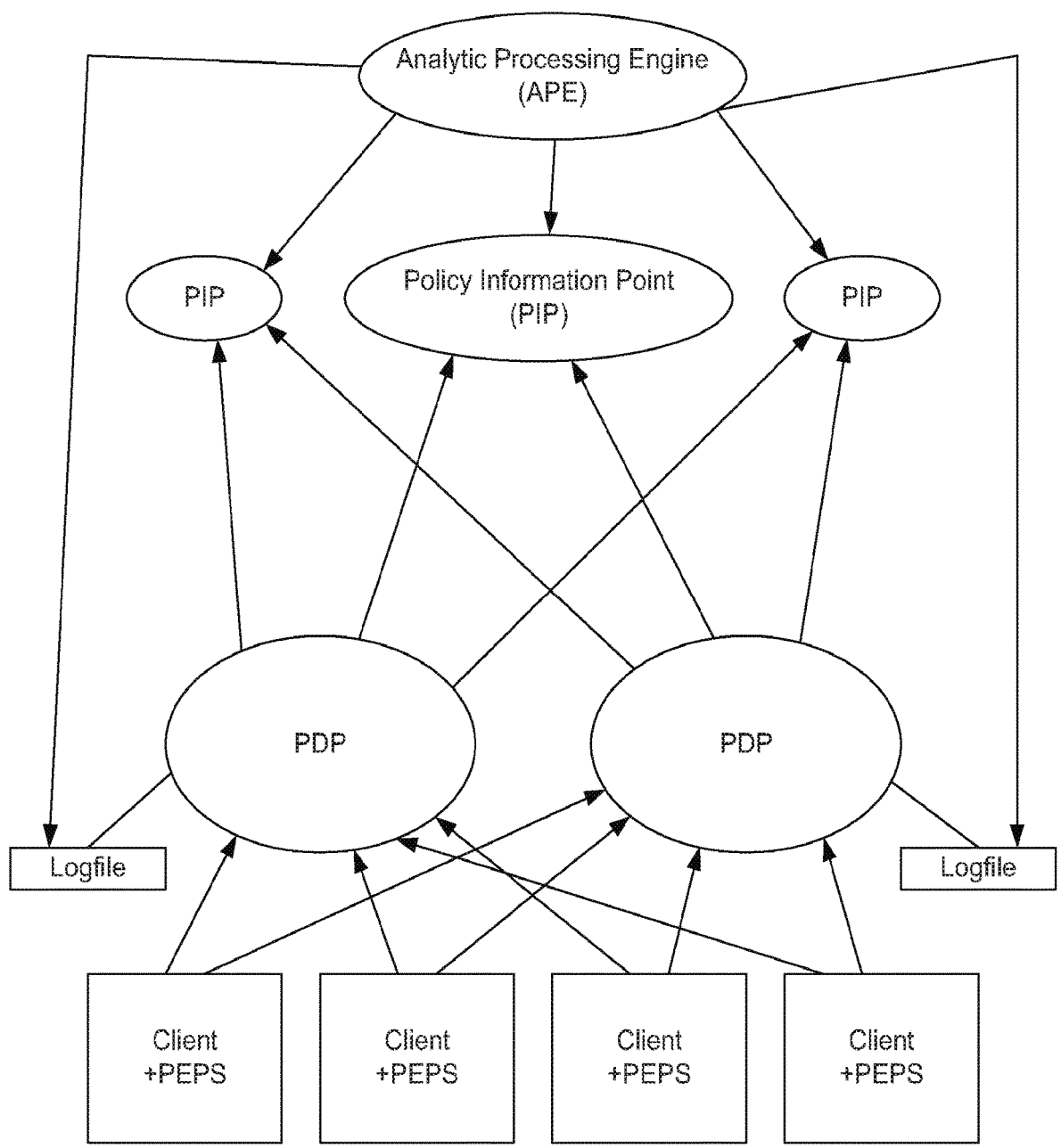

Write access to PIP-stored data is carefully controlled and is not available to PDPs. Functionality of a given PIP may go beyond storage and data query response capabilities, although those are the main functional goals of the PIP. For example, PIPs may also perform data processing on local data such as analytic functions, calibration against reference or baseline standards, or data type and format conversions. As shown in FIG. 3, analytic processing can occur any time new contextual information is presented at the PIP. PIPs may also serialize important system state information, such as global alert levels, network traffic patterns, or weather conditions for use in queries by PDPs for use in policy conditions.

Corporate information is often stored in Lightweight Directory Access Protocol (LDAP) directories (see Reinhard & Voglmaier, 2014) which deliver fast data retrieval with granular access control. LDAP-based information storage is well suited for use with PIPs in this system.

FIG. 3 presents a further augmentation to our system beyond that shown in FIG. 2. In FIG. 3, an additional entity, an Analytic Processing Engine (APE) has read-only access to certain PIPs, to the extent permitted by confidentiality and security rules, and also has read-only access to PDP log files. The purpose of the APE is to collate, monitor and analyze system events with consideration of contextual information available from the PIPS, and based on that analysis, provide visual, audible, or other presentation of system load conditions, detected security threats, and other activities to administrative users. The APE output may also be used in the reactive development of future policies for deployment to new PDPs, in response to system threats or other conditions. This development of policies in response to analyzed system conditions from an APE may be automatic (no human intervention), or under control of human policy authors based on APE results.

Figure 4:
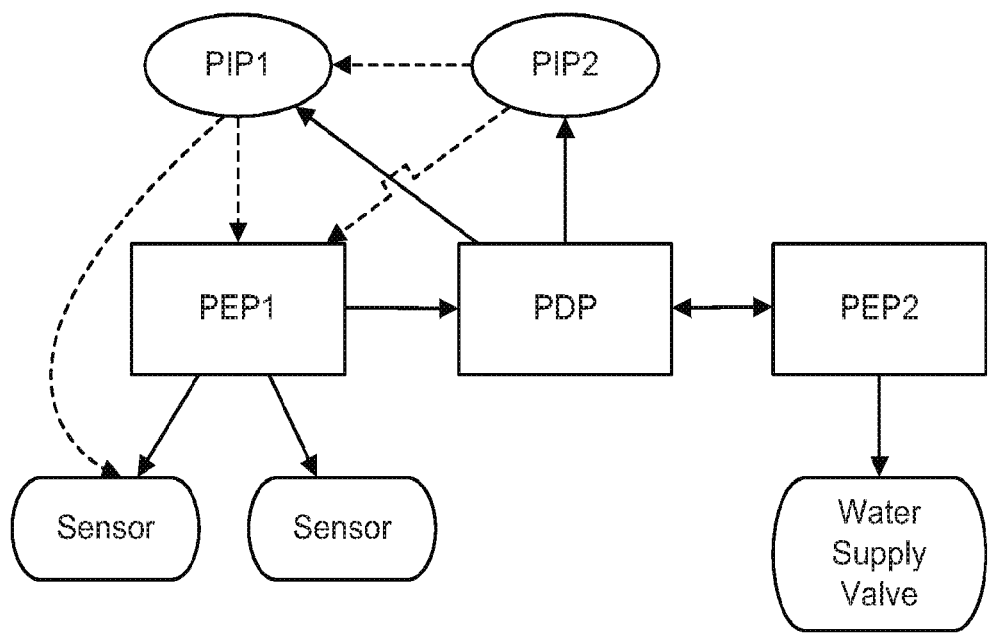

As a detailed, non-limiting example of how the system would be used, consider a network of sensors for moisture detection in a building (see FIG. 4). Here, there is an array of client devices, moisture detectors, for which the device history is important. The client devices consist of sensors in strategic places in a building to detect moisture, and the concern is high moisture content that may cause damage to the building and/or health risks to persons in the building. The moisture sensors report the presence of moisture and a PDP determines the appropriate response based on policy contained in the system. The response may range from sending a notification or alert, to sending the signal to shut off a "radio controlled" water valve.

In this example, there are two PEPs, one that serves as a sensor of contextual variables (PEP1), and one that controls a resource (PEP2), a nearby water supply valve. The functionality of PEP2 depends on the values sensed by PEP1. There are two PIPs, PIP1 that associates the identification of PEP1 with a device type and also associates PEP1 values with a set of moisture levels that can be used to determine a status (e.g. dry, damp, flooded). There is also PIP2 that associates the identification of PEP1 with the identification of PEP2. The PDP uses the data returned by PIP1 and PIP2 to reach a policy decision and then sends that policy decision to PEP2. When activated, the PEPs send queries to the PDP indicating the sensor identification and a value of the variable they are sensing. The PDP contacts PIP1 where the sensor identification is associated with the sensor type (e.g. moisture) and the sensor detected values are compared with sensor ranked values (baselines) to determine the degree of moisture present. This comparison returns a state value to the PDP, e.g. "critical state", in the case of a high moisture level. The PDP contacts PIP2 to obtain information of PEP2, for example a radio controlled water valve ID [number] associated with PEP1. The PDP evaluates the values returned by PIP1 and PIP2 and obtains a policy decision, for example "Close" or "Deny" that should apply to PEP2 (whose functionality depends on PEP1). The PDP sends a policy decision to PEP2. This decision may be pushed by the PDP when PEP2 communicates to the PDP, or it may be done on a regular polling basis, or on demand based on, for example, an administrative query.

INDUSTRIAL APPLICATION

The present invention is applicable to any domain where context-aware policy-based control is desirable. Examples were given of mobile device security where the context of the transaction or access to a resource was controlled by the policy-based system but it further used the features of the present invention to collect contextual information in the PIPs for use in adjudicating the query to execute the transaction or to use the resource. Similarly, an example of a moisture sensor network was given to show that the invention has wide applicability. In the example, a sensor array gathers data that is stored over time in the PIPs. The policy-based system then uses that information along with the rules to control the state of a valve.

CITATION LIST

Reinhard E. Voglmaier, "The ABCs of LDAP: How to Install, Run, and Administer LDAP Services", CRC Press, 2014, ISBN-13: 978-0849313462.

What is claimed is:

1. A context-aware policy-based access control system having at least one policy decision point for secure adjudication of access requests from a requesting client to protected resources on computing devices, the adjudication being completely hidden from the requesting client, the system comprising: a set of policy rules stored in a memory that describe allowable actions with all associated conditions, parameters, and contextual information for said policy rules;
   an agent coupled to the memory for intercepting the access request from the requesting client and for collecting all conditions and parameters necessary for adjudication as required by the policy rules;
   an incoming information interface for securely receiving external contextual information as required by the policy rules and for storing said external contextual information in at least one policy information point each having a local memory;
   a connecting interface for connecting policy information points to each other and to the policy decision point, each policy information point having an analytic processing engine for computing inferred information from the information stored in said policy information point, whereby the analytic processing engine further includes one or more analytical processors, one or more calibrators for calibrating internal variables against reference or baseline standards, and one or more data type and format conversions;
an encrypted back-channel coupling the agent and the policy decision point for communicating the access request including all conditions and parameters to the policy decision point thereby hiding the adjudication process from the requesting client; and
at least one policy enforcement point for enforcing adjudicated decisions;
whereby the policy decision point applies the set of policy rules for adjudicating access to the protected resources in accordance with the policy rules for permitted operations on the resources.

2. The system of claim 1, wherein the analytical processing engine includes a policy interface for connecting the analytical processing engine to the policy decision point in the policy-based access control subsystem.

3. The system of claim 1, wherein the connecting interface includes a secure network for encrypting information.

4. The system of claim 1, wherein only read-only access by the policy decision point to the policy information point is allowed.

5. The system of claim 1, wherein the analytical processing engine serializes system information for use by the policy decision point.

6. The system of claim 1, wherein information within the policy information point is contained in Lightweight Directory Access Protocol (LDAP) directories.

7. The system of claim 1, wherein the context-aware policy-based access control system is embedded in a lightweight computing object having local processing, memory, and network capabilities.

8. A method for context-aware policy-based access control for securely adjudicating access requests from a requesting client to protected resources on computing devices, the adjudication being completely hidden from the requesting client comprising the steps of:
   storing policy rules in a memory describing allowable actions and all associated conditions, parameters, and contextual information; intercepting the access request from the requesting client at the agent;
   receiving secure contextual information from external sources at policy information points;
   storing said contextual information at the policy information points, each policy information point having an analytic processing engine for computing inferred information from the information stored in said policy information point, whereby the analytic processing engine further includes one or more analytical processors, one or more calibrators for calibrating internal variables against reference or baseline standards, and one or more data type and format conversions;
   connecting the policy information points to at least one policy decision point;
   transmitting the access request and all associated conditions and parameters as required by the policy rules to the at least one policy decision point via the encrypted back-channel; transmitting the contextual information from the policy information points to the policy decision points as required by the policy rules;
   adjudicating the access request in accordance with the policy rules for permitted operations on the protected resource by evaluating the policy rules at the at least one policy decision point using contextual information from the policy information points; and
enforcing the adjudicated decision by at least one policy enforcement point.

9. The method of claim 8, wherein multiple policy information points are connected to each other using a secure network.

10. The method of claim 8, wherein contextual information is transmitted between policy information points and to policy decision points over a secure encrypted network.

* * * * *